(12) United States Patent
Meier et al.

(10) Patent No.: US 6,651,430 B2
(45) Date of Patent: Nov. 25, 2003

(54) DEVICE FOR OPERATING A TURBOCHARGER AND A TURBOCHARGER

(75) Inventors: Frank Meier, Kornwestheim (DE); Thomas Bleile, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/203,906

(22) PCT Filed: Nov. 29, 2001

(86) PCT No.: PCT/DE01/04476

§ 371 (c)(1), (2), (4) Date: Aug. 13, 2002

(87) PCT Pub. No.: WO02/48520

PCT Pub. Date: Jun. 20, 2002

(65) Prior Publication Data

US 2003/0000212 A1 Jan. 2, 2003

(30) Foreign Application Priority Data

Dec. 14, 2000 (DE) .......................... 100 62 184

(51) Int. Cl.[7] ............................................... F02D 23/00
(52) U.S. Cl. ................. 60/602; 60/60; 60/611; 73/118.1
(58) Field of Search ..................... 60/600–603, 605.1, 60/611

(56) References Cited

U.S. PATENT DOCUMENTS

| | | | | |
|---|---|---|---|---|
| 5,121,604 A | * | 6/1992 | Berger et al. | 60/602 |
| 5,224,853 A | | 7/1993 | Kazuo et al. | |
| 5,987,888 A | * | 11/1999 | Weisman, II et al. | 60/612 |
| 6,272,859 B1 | * | 8/2001 | Barnes et al. | 60/602 |
| 6,298,718 B1 | * | 10/2001 | Wang | 73/118.1 |
| 6,318,083 B1 | * | 11/2001 | Machida et al. | 60/611 |
| 6,427,445 B1 | * | 8/2002 | Isaac et al. | 60/602 |
| 6,510,691 B1 | * | 1/2003 | Schmid | 60/602 |
| 2003/0010019 A1 | * | 1/2003 | Engel et al. | 60/602 |

* cited by examiner

Primary Examiner—Thomas Denion
Assistant Examiner—Thai-Ba Trieu
(74) Attorney, Agent, or Firm—Kenyon & Kenyon

(57) ABSTRACT

In a device for switching an exhaust gas turbocharger and an exhaust gas turbocharger having such a device, the device is used for exhaust gas turbochargers having a variable turbine geometry as well as for other turbochargers (e.g., waste-gate turbochargers) having an electronically regulated final controlling element. The exhaust gas turbocharger is switched by a switching signal P from a regulated operation A with a boost pressure regulator to an unregulated operation B with a boost pressure control, wherein a delay device is provided for generating the switching signal P with a time delay.

11 Claims, 3 Drawing Sheets

DEVICE FOR OPERATING A TURBOCHARGER AND A TURBOCHARGER

FIELD OF THE INVENTION

The present invention relates to a device for switching exhaust gas turbochargers for internal combustion engines, in particular for diesel engines, as well as an exhaust gas turbocharger.

BACKGROUND INFORMATION

Exhaust gas turbochargers having an adjustable turbine geometry are being used to an increasing extent in modern diesel engines in particular. Due to the variable turbine geometry with which the damming effect of the turbine is continuously variable, it is possible to achieve an energetically more favorable regulation of the exhaust gas turbocharger because all of the energy from the exhaust gas may be utilized. The exhaust gas turbocharger may be adapted to the instantaneous engine operating point, so that optimization with regard to the exhaust gas emissions and fuel consumption is possible. Such exhaust gas turbochargers are switched from regulated operation to controlled operation by switching off the boost pressure regulator in certain engine operation ranges. This switching may result in the following problems in exhaust gas turbochargers having an adjustable turbine geometry. When the combustion engine is operated at low engine speeds and low injection quantities, high boost pressures are desired, which is why the turbine control apparatus of the exhaust gas turbocharger is then switched to a closed position. However, closing of the turbine control device at the time of transition from regulated operation to controlled operation of the engine may then result in the compressor of the exhaust gas turbocharger being operated for a certain period of time at an operating point which is referred to in the compressor characteristics map as "compressor pumping." As a result, a strong oscillation is induced in the fresh air mass flow and the recycled exhaust gas mass flow, which is why, firstly, the exhaust gas emission values deteriorate, and secondly, loud flow noises may occur in the air intake system of the vehicle. In addition, such "compressor pumping" may have a brief negative effect on engine power when, for example, the injection quantity is limited due to the great pulsation in the air intake by the engine. This has a negative effect on driving comfort.

SUMMARY

An exemplary embodiment of the present invention provides a switching device for exhaust gas turbochargers as well as an exhaust gas turbocharger having a variable turbine geometry which operates optimally and uniformly in all operating ranges, where operation of the exhaust gas turbocharger is to be improved in the transition range between regulated and controlled operation of the exhaust gas turbocharger in particular. This object is achieved with a device and an exhaust gas turbocharger.

Due to the delay device with which the switching signal for switching the boost pressure regulator is generated with a time delay, the boost pressure regulator is left on for a certain period of time in the transition from regulated operation to controlled operation. In this manner, the instantaneous boost pressure of the exhaust gas turbocharger is lowered to a level at which "compressor pumping" does not occur. Due to the fact that the boost pressure regulator lowers the instantaneous boost pressure accordingly, this may yield a reduction in flow noises in the air intake system of the vehicle. In addition, it is possible in this manner to achieve greater steady-state boost pressures in controlled operation of the boost pressure regulator, and this may yield a dynamic advantage in subsequent acceleration of the vehicle. This may greatly improve engine power in all operating states of the engine and the exhaust gas turbocharger. In addition, the exhaust gas emission values of engines are also reduced through an exemplary embodiment of the present invention.

According to an exemplary embodiment of the present invention, the switching signal for switching from regulated to unregulated operation is delayable variably as a function of the operating state of the engine. In this manner, the device may respond dynamically to different operating states of the respective engine, which is why the efficacy of the delay in switching is increased. The exhaust gas performance and driving dynamics are further improved.

According to another exemplary embodiment of the present invention, the delay device is equipped with an engine-dependent time constant. Due to this time constant, which is optimally selectable as a function of type with various engines, the device may also be adapted to different types of engines. This device may also be manufactured easily and inexpensively due to the fact that the time constant is set only once in a fixed manner.

According to another exemplary embodiment of the present invention, a hysteresis circuit having an upper characteristic curve and a lower characteristic curve as switching thresholds is provided for generating the switching signal. On exceeding these switching thresholds, the switching signal may not be generated directly but instead with a time delay, which is why the exhaust gas turbocharger may also be operated in the transition range between regulated and controlled operation in an operating range which prevents "compressor pumping."

According to another exemplary embodiment of the present invention, the device is adapted for retrofitting into existing exhaust gas turbocharger systems. This may provide the advantage that the device may also be installed subsequently in turbocharger systems to improve driving dynamics and exhaust gas emissions. Existing engines may also be optimized in this regard.

The exhaust gas turbocharger for compressing the air mass flow has a variable turbine geometry for adjusting the compression ratio and a delay device for time-delayed switching of the boost pressure regulator from regulated operation to controlled operation. According to an exemplary embodiment, the delay device is integrated into the boost pressure regulator, i.e., no additional component may be necessary.

According to an exemplary embodiment in this regard, the delay device is part of a central engine control device. This may yield an advantage because all the control systems are combined, and thus the paths between signal generation and processing are short.

DETAILED DESCRIPTION

Figure 1:
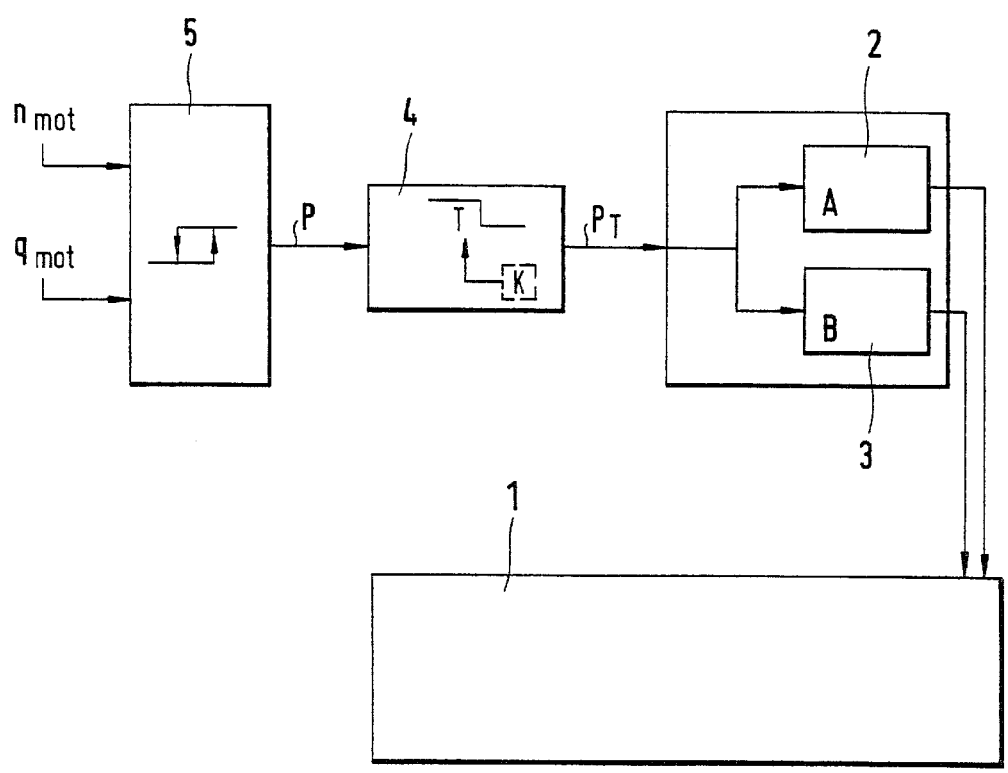
FIG. 1 is a schematic diagram of an exemplary embodiment of the present invention having a boost pressure regulator and an exhaust gas turbocharger.

FIG. 1 illustrates the device for switching an exhaust gas turbocharger according to an exemplary embodiment of the present invention, illustrated schematically in an overall view. An exhaust gas turbocharger 1 having a variable turbine geometry is regulated by a boost pressure regulator 2. The variable turbine geometry may be implemented in a conventional manner, e.g., through adjustable vanes of the turbocharger, or it may have another conventional embodiment. In certain operating states of the engine operation is switched from regulated operation A by a boost pressure regulator 2 to unregulated operation B by a boost pressure control 3. Switching is performed by a switching signal P which is generated in a hysteresis circuit 5 on the basis of the engine speed and the injection quantity as input variables. Hysteresis circuit 5 has an upper characteristic curve and a lower characteristic curve such that switching signal P is generated on exceeding the upper characteristic curve or dropping below the lower characteristic curve. Switching signal P is sent to a delay device 4 by which a delayed switching signal $P_T$ is generated. Delayed switching signal $P_T$ is relayed to boost pressure regulator 2 and boost pressure actuator 3 for switching between operating modes A and B. For the time delay of switching signal P in delay device 4, a time constant K is deposited, i.e., stored in delay device 4. Input signal P is delayed in time by this time constant in delay device 4. Time constant K may be varied for adaptation to different types of engines. As an alternative, time constant K may also be replaced by a variable time delay quantity, which is variable, for example, as a function of the operating state of the engine. The time delay in delay device 4 may also be implemented in any other manner.

Figure 2:
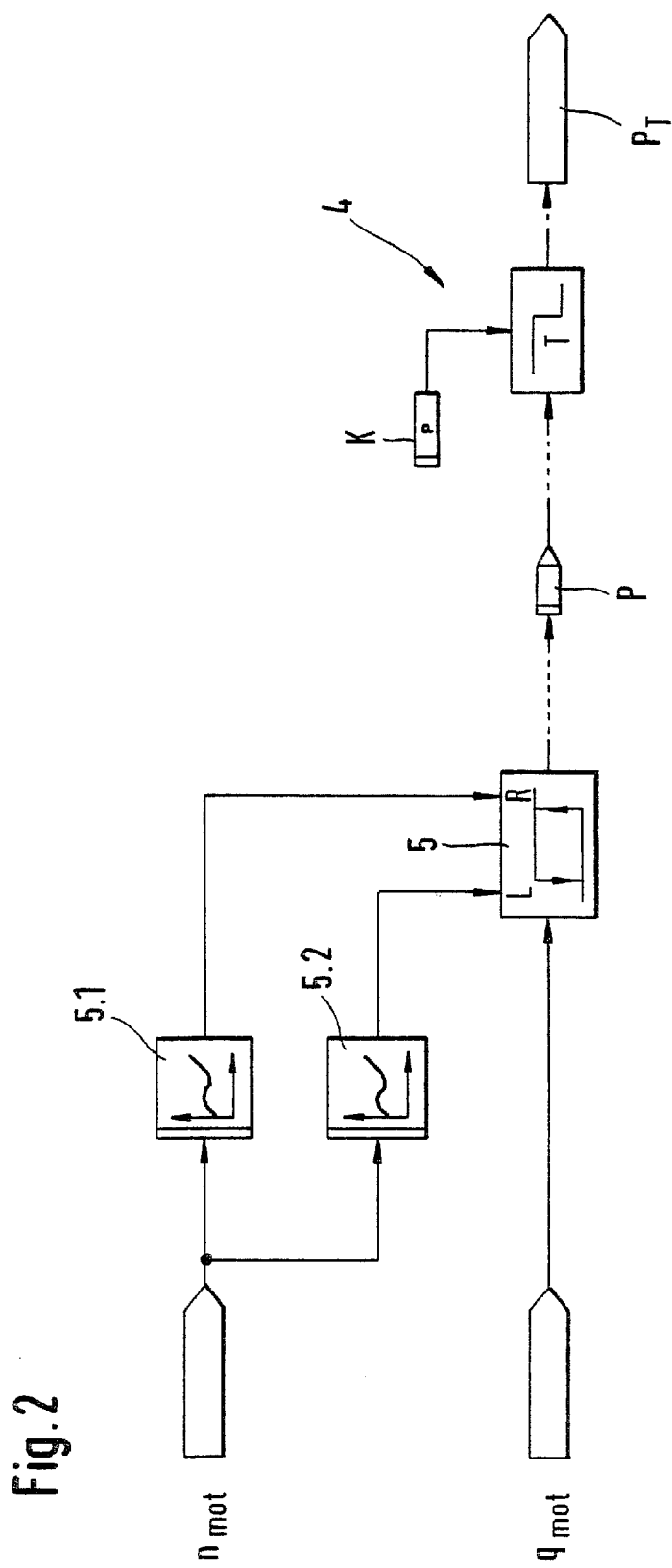
FIG. 2 is a block diagram of the delay device of the exemplary embodiment illustrated in FIG. 1.

FIG. 2 illustrates the delay device according to an exemplary embodiment of the present invention illustrated in FIG. 1 in the form of a block diagram. Switching signal P is formed by a hysteresis circuit 5 which receives injection quantity $q_{mot}$ as input signals. Hysteresis circuit 5 includes an upper characteristic curve 5.1 and a lower characteristic curve 5.2, each forming the threshold value for engine speed $n_{mot}$. On exceeding one of characteristic curves 5.1, 5.2, signal P is generated in circuit 5, to switch operation of the exhaust gas turbocharger from regulated operation A to unregulated operation B. To prevent "compressor pumping" which may occur in switching from exhaust gas turbochargers having a variable turbine geometry, signal P is delayed by a time constant K in a delay device 4 such that boost pressure regulator 2 is shut down only with delayed switching signal $P_T$. In this manner, the instantaneous boost pressure in the compressor is lowered to a level at which compressor pumping, as manifested in a great fluctuation in the intake air mass flow and thus the recovered exhaust gas volume flow, does not occur.

Figure 3A:
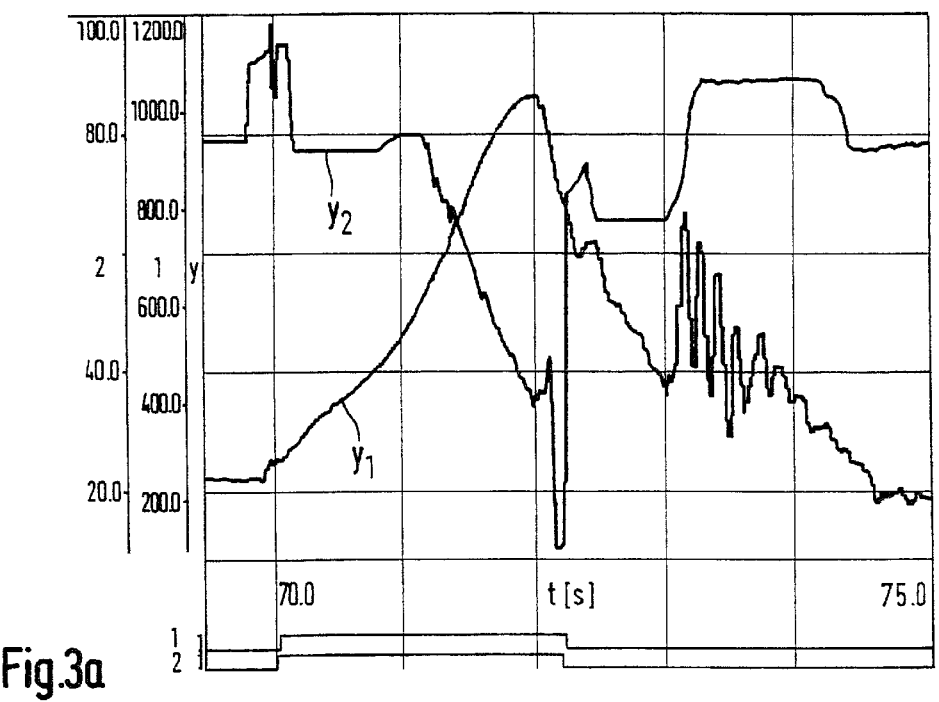
FIG. 3a illustrates the sampling ratio of the boost pressure actuator and the fresh air mass over the time sequence in switching an exhaust gas turbocharger.
Figure 3B:
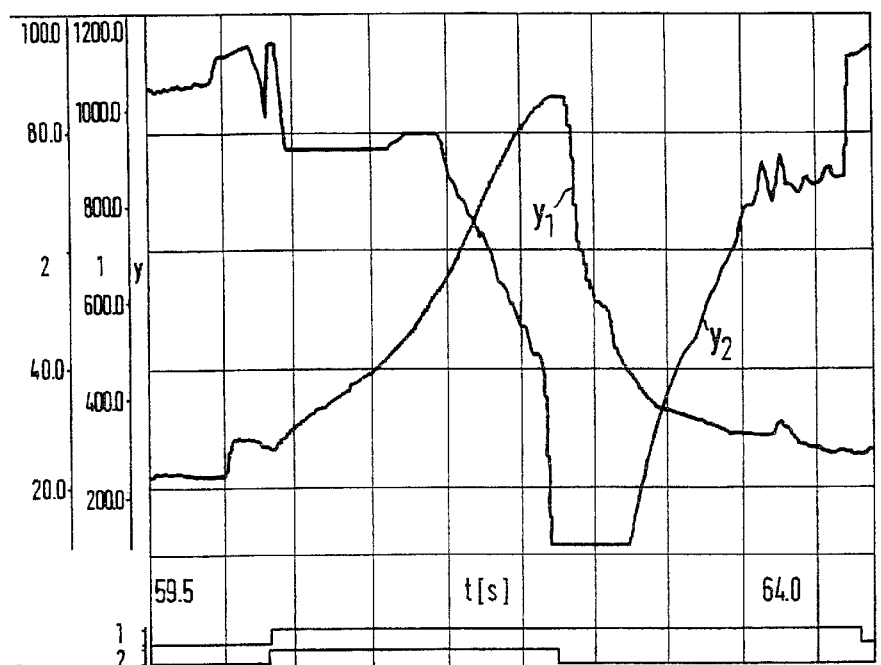
FIG. 3b ilustrates the sampling ratio of the boost pressure actuator and the fresh air mass in switching an exhaust gas turbocharger with a time delay using a device according to an exemplary embodiment of the present invention.

FIG. 3a is a diagram of the sampling ratio of the boost pressure actuator and the fresh air mass flow over time in switching an exhaust gas turbocharger. FIG. 3b is a similar diagram except that in this case a device according to an exemplary embodiment of the present invention has been used. The lower area of FIG. 3a illustrates that pulses t1 and t2 are delivered simultaneously, which means that boost pressure regulator 2 is shut down with no time delay. Switching signal P is sent directly to boost pressure regulator 2. The right-hand area illustrates that the curve of fresh air mass flow $y_1$ jumps to high levels shortly after undelayed shutdown of the boost pressure regulator, and the sampling ratio of boost pressure actuator $Y_2$ immediately jumps to high values when the regulator is shut down. This means that shutting down the boost pressure regulator here results in "compressor pumping."

FIG. 3b, however, illustrates a device according to an exemplary embodiment of the present invention which is why the corresponding curves are more uniform here. The shutdown takes place with a 2-sec time delay, which is apparent from time-delayed pulses t1 versus t2. In this manner, the boost pressure regulator is left running for 2 sec longer, which is why the course of fresh air mass flow $y_1$ drops uniformly in the right-hand area of the diagram. The sampling ratio of boost pressure actuator $y_2$ no longer jumps to values, but instead increases smoothly. This illustrates the efficacy of the device according to an exemplary embodiment of the present invention, which effectively prevents "compressor pumping" in exhaust gas turbochargers having an adjustable turbine geometry when switching modes of operation.

Reference Notation

| | |
|---|---|
| 1 | exhaust gas turbocharger |
| 2 | boost pressure regulator |
| 3 | boost pressure control |
| 4 | delay device |
| 5 | hysteresis circuit |
| 5.1 | upper characteristic curve of the hysteresis circuit |
| 5.2 | lower characteristic curve of the hysteresis circuit |
| $n_{mot}$ | engine speed |
| $q_{mot}$ | injection quantity |
| P | switching signal |
| $P_T$ | delayed switching signal |
| T | delay |
| K | delay constant |
| t1, t2 | time pulses |
| $y_1$ | fresh air mass flow |
| $y_2$ | sampling ratio of the boost pressure actuator |
| A | regulated operation mode |
| B | unregulated operation mode |

What is claimed is:

1. A device for switching an exhaust gas turbocharger for an internal combustion engine having a variable turbine geometry, comprising:
    a boost pressure control;
    a boost pressure regulator configured to regulate a boost pressure;
    an arrangement configured to switch the exhaust gas turbocharger by a switching signal from a regulated operation using the boost pressure regulator to an unregulated operation using the boost pressure control; and
    a delay device configured to generate the switching signal with a time delay.

2. The device according to claim 1, wherein the switching signal is variably delayable as a function of an operating state of the engine.

3. The device according to claim 1, wherein the delay device includes an engine-dependent time constant.

4. The device according to claim 3, wherein the engine-dependent time constant is approximately two seconds.

5. The device according to claim 1, further comprising a hysteresis circuit including an upper characteristic curve and a lower characteristic curve as switching thresholds, the hysteresis circuit configured to generate the switching signal.

6. The device according to claim 1, wherein the device is adapted to retrofit into an existing exhaust gas turbocharger system.

7. The device according to claim 1, wherein the exhaust gas turbocharger is for a diesel engine.

8. An exhaust gas turbocharger for compressing an air mass flow of an engine, comprising:
- a variable turbine geometry configured to adjust a compression ratio; and
- a device configured to switch the exhaust gas turbocharger including:
  - a boost pressure control;
  - a boost pressure regulator configured to regulate a boost pressure;
  - an arrangement configured to switch the exhaust gas turbocharger by a switching signal from a regulated operation using the boost pressure regulator to an unregulated operation using the boost pressure control; and
  - a delay device configured to generate the switching signal with a time delay.

9. The exhaust gas turbocharger according to claim 8, wherein the delay device is integrated into the boost pressure regulator.

10. The exhaust gas turbocharger according to claim 8, wherein the delay device is part of a central engine control device.

11. The exhaust gas turbocharger according to claim 8, wherein the exhaust gas turbocharger is for a diesel engine.

* * * * *